Figure 1:
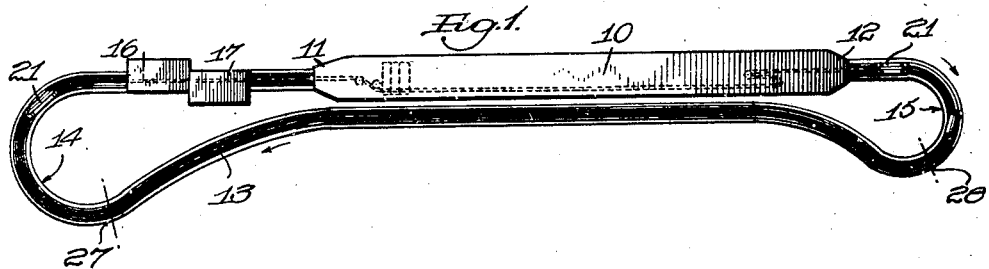

Sept. 6, 1932.  Z. S. LOGAN  1,876,066

CONVEYING SYSTEM

Filed Jan. 17, 1929   2 Sheets-Sheet 1

Inventor
ZACK S. LOGAN
By C. L. Parker, Jr.
Attorney

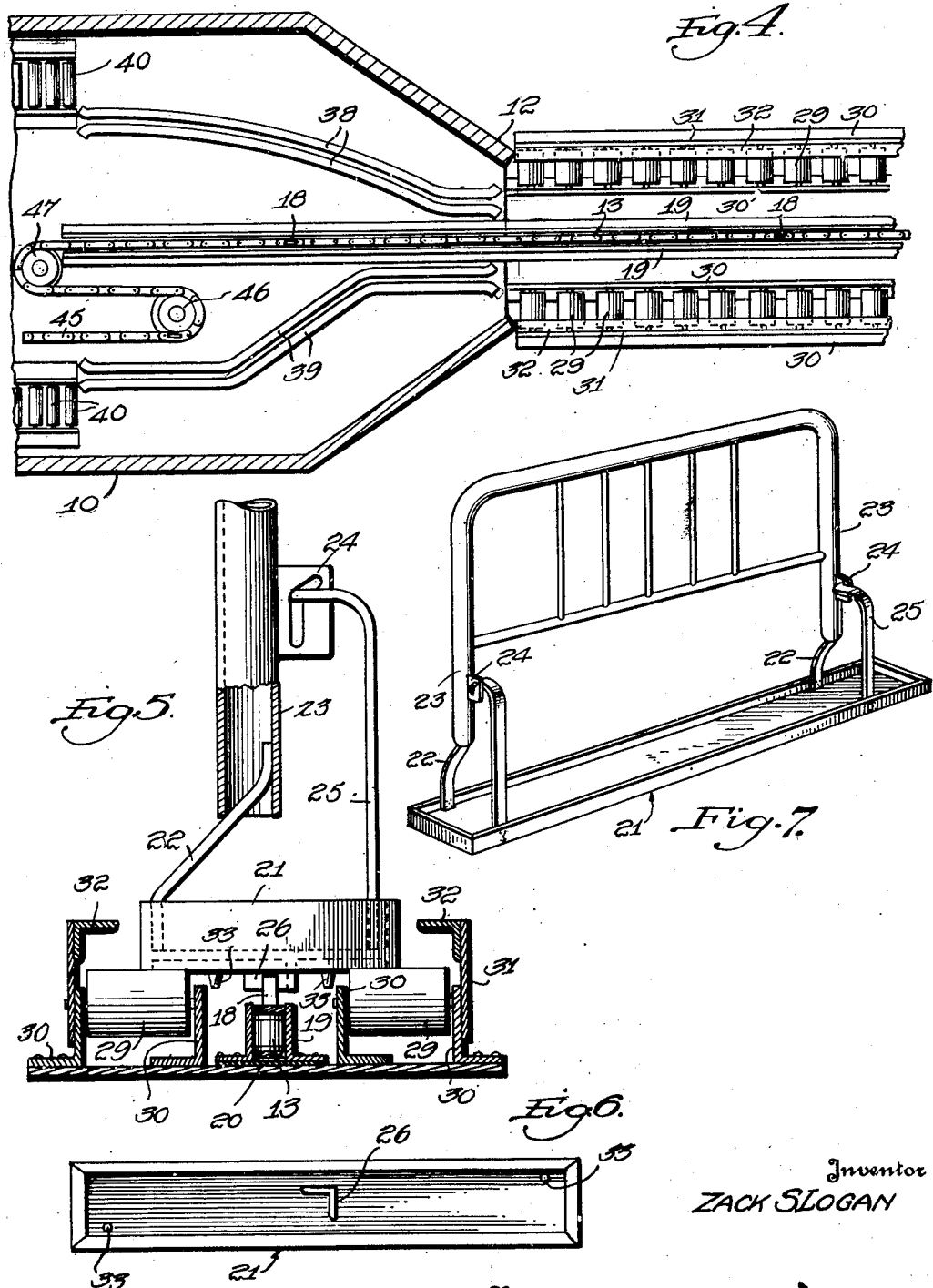

Patented Sept. 6, 1932

1,876,066

UNITED STATES PATENT OFFICE

ZACK S. LOGAN, OF LOUISVILLE, KENTUCKY, ASSIGNOR TO LOGAN CO., INC., OF LOUISVILLE, KENTUCKY, A CORPORATION OF KENTUCKY

CONVEYING SYSTEM

Application filed January 17, 1929. Serial No. 333,043.

This invention relates to conveyors, and more particularly to novel conveying means for moving articles along a pathway whereby the articles will be subjected to the action of spraying devices for applying surface coatings and then transferred to an oven for the purpose of baking the enamel or other surface coating on the articles.

In the manufacture of many metal articles, such as beds, it is the common practice to surface coat the articles by spraying enamel or the like thereon, and then to transfer the articles to an oven in which the enamel is baked on the articles. The placing of the articles in the oven is usually a manually performed operation which requires the services of workmen, and requires considerable time for its completion particularly where the articles are being manufactured in relatively large quantities.

The present invention has for its principal object the provision of means for conveying articles such as the head and foot panels of beds through spray booths, wherein the enamel is sprayed on the panels while continuously moving therethrough, and subsequently conveying the panels through a baking oven where they are allowed to remain from ten to twelve hours to complete the baking of the enamel.

A further object is to provide novel apparatus of the character referred to wherein the discharging of successive articles from the oven is accomplished automatically by the introduction of successive articles into the inlet end of the oven, and is not dependent in any way on the speed of travel of the conveying means.

A further object is to provide apparatus of the character above referred to wherein articles such as the head and foot panels of beds may be conveyed longitudinally through spray booths to be completely covered with enamel or the like, and then transferred to a baking oven and automatically moved with respect to the conveying means whereby the articles will assume a position substantially at right angles to the length of the oven to economize in the space required for the articles, and thus permitting a large number of them to be arranged in the oven.

A further object is to provide an apparatus of the character just referred to wherein means is provided for disengaging the conveying means from the articles after the latter have ben deposited in the oven to permit continuous movement of the conveyor without transmitting any movement to the articles in the oven.

The objects of the invention, as referred to above, have to do with the conveying of articles such as the head and foot panels of beds whereby the latter may be provided with surface coatings and then subjected to the action of a baking heat for the surface coatings, but as will become apparent, the invention has other applications such as its use in conveying articles to and depositing them at a suitable storage point.

Figure 2:
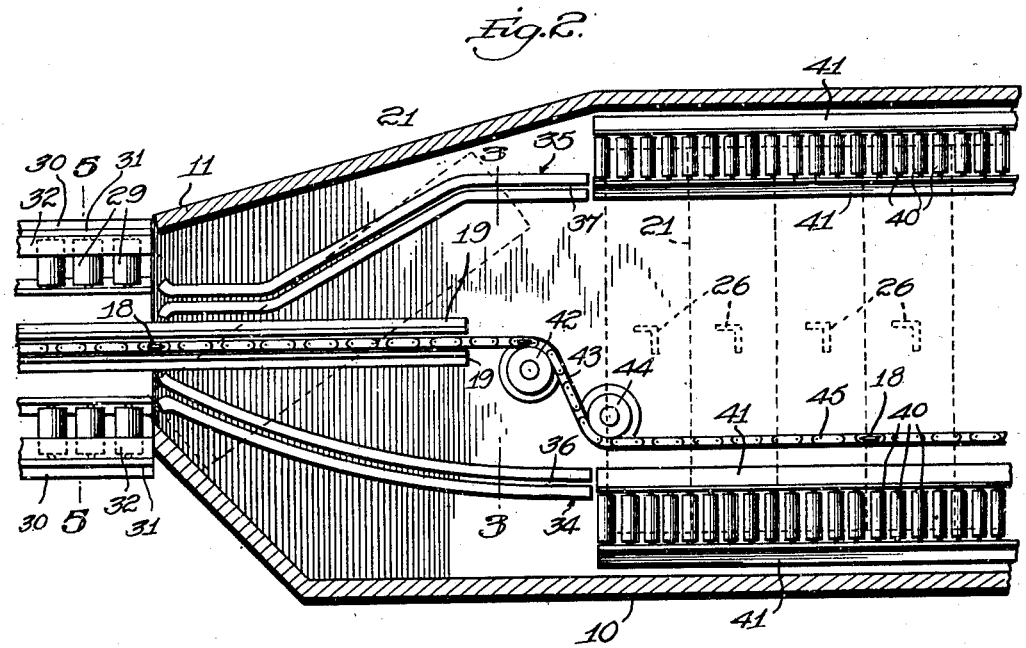
Figure 3:
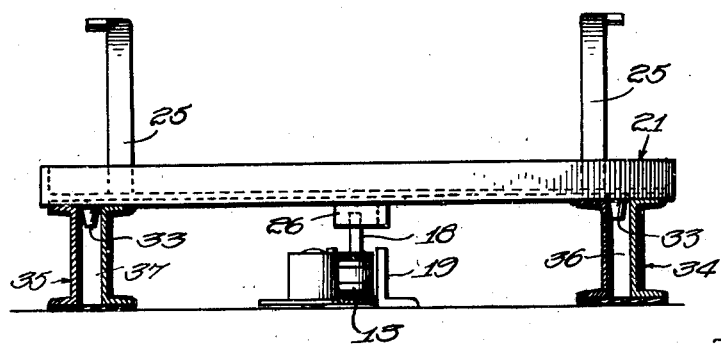

In the drawings I have shown one embodiment of the invention. In this showing,

Figure 1 is a diagrammatic plan view,

Figure 2 is a horizontal section through the inlet end of the oven and associated elements, Figure 3 is a detail section on line 3—3 of Figure 2, Figure 4 is a view similar to Figure 2 taken at the opposite end of the oven, Figure 5 is a section on line 5—5 of Figure 2 showing one of the articles in position on the conveyor, Figure 6 is a bottom plan of one of the conveying frames, and, Figure 7 is a perspective view of the same showing a bed panel in position thereon.

Referring to Figure 1 of the drawings, the numeral 10 designates a baking oven, having inlet and outlet ends 11 and 12 respectively, which are restricted in size to prevent the excess escape of heat from the oven, as will be apparent. The oven may be of any desired type to provide the proper heating action, and for example, may be provided with steam coils extending throughout its length. The present invention, however, does not relate specifically to the oven, and accordingly the latter need not be referred to in detail.

An endless flexible conveyor 13 is arranged as shown generally in Figure 1 and moves in the direction of the arrow. The conveyor preferably is in the form of a sprocket or similar chain, one run of which extends through the oven in a manner to be described, the chain moving from the inlet toward the outlet end of the oven. The other, or outside run of the chain, extends along the outside of the oven, and makes loops 14 and 15 at its extremities. The portion of the chain externally of the oven, including the loops 14 and 15, is guided in a manner to be referred to. Prior to entering the oven 11, the chain passes through spraying booths 16 and 17 each of which is adapted to spray enamel or other surface coating composition against opposite sides of articles carried by the conveyor.

As previously stated, the conveyor is preferably in the form of a sprocket chain, and at spaced intervals along the chain, certain links thereof are provided with upstanding lugs 18 forming pusher elements for a purpose to be described. If desired, substantially the entire length of the chain may run between angle iron guides 19 beneath which is arranged a plate 20 upon which the chain slides. As shown in the drawings, the guide means may be associated with the entire portion of the chain which is not arranged within the oven, and the guide means may extend into each end of the oven, as shown in Figures 2 and 4.

The chain 13 is adapted to convey articles through the spray booths 16 and 17, and thence into the oven 10. It will be apparent that the apparatus is adapted for use in connection with any desired form of articles to be treated in the manner referred to, and in the drawings, the apparatus has been illustrated as being provided with means for conveying the head and foot panels of beds in the manner referred to.

Referring to Figures 3, 5, 6 and 7, the numeral 21 designates a rectangular frame provided with spaced upstanding supports 22 at one side thereof adapted to extend into the lower ends of the leg portions of a bed panel 23, the panel being provided with the usual brackets 24 to which the side rails of the bed are adapted to be attached. At the opposite side of the frame, spaced brackets 25 are provided, the upper ends of which are adapted to engage the brackets 24 to maintain the bed panel in vertical position. It will be apparent that the panel extends longitudinally with respect to the frame.

Any number of the frames 21 may be employed, and in practice, it is preferred that a relatively large number be used in order that the full capacity of the oven may be utilized, in a manner to be described. In order to convey the frames to the oven, means is provided whereby the chain 13 is adapted to act as propelling means when the frames are arranged thereon. Each frame is provided against its bottom face with a depending engaging element 26, preferably in the form of an angle iron, as shown in Figure 6. The engaging element of each frame is adapted to contact with one of the pusher elements 18 carried by the chain, whereby movement of the chain is transmitted to the frames.

Successive frames are loaded with the panels 23 or other articles substantially at the point 27, and after the frames are discharged from the oven, the articles are unloaded at approximately the point 28, as indicated in Figure 1. Suitable means are provided for properly supporting the frames in horizontal position on the chain 13 from the outlet end of the oven to the inlet end thereof. For this purpose, a series of rollers 29 is arranged on each side of the chain between the ends of the oven externally thereof. These rollers are supported in any suitable form of bearings, such as angle irons 30, as indicated in Figure 5. The outermost bearings 30 are provided with upwardly extending plates 31 to which are connected angle irons 32 which define a channel through which the frames 21 are adapted to move, the angle irons 32 obviously preventing lateral displacement of the frames 21.

As indicated in Figure 1, the frames 21 travel longitudinally with respect to the chain, and hence the bed panels 23 are longitudinally arranged with respect to their line of travel as they move with the chain 13. Accordingly, the bed panels assume the proper position when passing through the booths 16 and 17 to permit the spraying action to take place efficiently and thus completely cover the metal of the panels with enamel or other surface coating composition. However, since the bed panels and the supporting frames 21 are relatively long, it is desired that these elements be turned at right angles to the line of movement of the chain after they pass into the oven 10 in order that space may be economized and as many panels as possible always may be within the oven 10 to be subjected to the baking action therein.

For the purpose of turning the frames 21 substantially at right angles to the chain for the purpose above stated, the bottom of each frame is provided adjacent diagonally opposite corners with depending pins 33, as shown in Figures 3, 5 and 6. As each frame moves into the inlet end of the channel longitudinally with respect to the chain, the pins 33 of the frame will lie on opposite sides of the chain.

Within the inlet end of the oven 10 pairs of rails 34 and 35 are arranged on opposite sides of the line of movement of the chain 13. The rails 34 are spaced apart and shaped to form therebetween a channel 36 which curves away from the center line of the oven as the channel gets further from the inlet end of the oven. The rails 35 are similarly spaced to form a channel 37 therebetween, the ends of which are preferably straight and parallel to the center line of the oven, while the intermediate portion of the channel 37 is angularly arranged as clearly shown in Figure 2. The pins 33 of each frame 21 are adapted to engage respectively within the outer ends of the channels 36 and 37 whereby each frame, as it enters the oven, is caused to gradually turn to a position at right angles to the direction of movement of the chain.

For the purposes of again turning the frames 21 to a position parallel with the chain as the frames pass from the outlet end 12 of the oven, similar pairs of rails 38 and 39 are arranged within the outlet end of the oven. The channels formed between these rails serve to turn the frames 21 in the manner referred to by bringing the pins 33 of each frame toward each other. As the frames move along the pairs of rails 34, 35, 38 and 39, they are supported on these rails and slide therealong.

The oven is provided throughout the greater portion of its length, adjacent each side thereof, with supporting rollers 40, as shown in Figures 2 and 4. These sets of rollers extend from the inner ends of the rails 34 and 35 to the inner ends of the rails 38 and 39, and act as supporting means for the frames 21 after the latter have been turned transversely with respect to the oven. The rollers 40 are suitably supported for rotation in angle iron or similar bearings 41.

It is the common practice to bake metallic articles of the character referred to in a suitable oven for from ten to twelve hours, and since it was desirous that the operation of the chain 13 be continuous, means is provided for disengaging the chain and the frames 21 after the latter have assumed positions at right angles to the line of movement of the chain in order that movement of the latter may in turn be transmitted to the frames. Referring to Figure 2, the numeral 42 designates an idler sprocket or pulley over which the inner run of the chain 13 passes, the sprocket being arranged approximately at the point at which each successive frame has become turned to a position at right angles to the line of movement of the chain. After passing around the sprocket 42, the chain moves outwardly with respect to the center line of the oven, as indicated at 43, and then passes around a second sprocket or pulley 44, thus providing an inoperative length of chain 45 within the oven. Obviously, the pusher elements 18 of the portion 45 of the chain will not engage the engaging members 26 of the frames supported on the rollers 40, and accordingly the chain is adapted to move continuously without transmitting any movement to the frames 21 supported on the rollers 40.

Adjacent the outlet end of the oven, the offset portion 45 of the chain passes around a sprocket or pulley 46 and thence inwardly and around another sprocket 47, whereupon the chain assumes a position in alinement with the portion of the chain entering the oven 11, that is, in alinement with the center line of the oven, and thus, as each successive frame passes from the rollers 40, the engaging element 26 thereof will contact with one of the pusher elements of the chain whereby the frame will be positively conveyed from the oven.

Any suitable means may be employed for driving the chain 13, and such means accordingly has not been illustrated. It will be obvious that a suitable sprocket may engage the chain at any desired point, and may be connected to a suitable source of power for driving the chain.

The operation of the apparatus is as follows:

As previously stated, the operation of the conveyor chain is continuous, and a sufficient number of the frames 21 is employed so that the oven may be filled to its capacity at all times, while a plurality of the frames are also carried by the chain outside of the oven so as to be in position to receive articles to be enameled. The articles are placed upon successive frames 21 approximately at the point 27, and the chain moving in the direction of the arrow, carries the articles to be enameled slowly through the booths 16 and 17. The booths are provided with suitable means for spraying enamel or other surface coating compositions against opposite sides of the bed panels or other articles to completely coat the same. The particular spray means forms no part of the present invention and need not be illustrated in detail. As a matter of fact, as will be explained, the invention is not in any way limited in its use as means for conveying articles through spraying booths.

During the travel of the chain from the outlet end 12 of the oven to the inlet end 11 thereof, the frames are arranged parallel to the chain as previously stated. This arrangement of the frames is shown in Figures 1 and 5, and referring to the latter figure, it will be noted that the frames are supported for movement upon the rollers 29, while the angle irons 32 serve to prevent angular displacement of the frames. As also previously stated, the pusher members 18 effect movement of the frames by engaging against one side of the engaging elements 26 carried by the frames. Thus it will be apparent that the frames are arranged longitudinally with respect to the chain as they enter the inlet end 11 of the oven.

As each successive frame enters the oven, it leaves the adjacent rollers 29, and is supported upon the rails 34 and 35 for sliding movement therealong. The outer ends of the channels 36 and 37 are arranged respectively in alinement with depending pins 33 of the frame entering the oven. The outward divergence of these channels causes the pins to be moved apart, thus swinging the frame to an angular position as suggested in dotted lines in Figure 2. During this movement, the engaging element 26 of the frame remains in alinement with the corresponding pusher member 18, and accordingly this member continues to transmit movement to the frame.

The angular change in position of the frame continues until the frame reaches a position over the pulley 42, at which time the frame will have assumed a position substantially at right angles to its direction of movement. At this point, the entering side of the frame will contact with the adjacent side of the frame last carried into the oven, and accordingly it will be apparent that each successive entering frame effects movement of all of the frames previously conveyed into the oven. As each successive frame leaves the rails 34 and 35, it is supported upon the rollers 40, and thus movement of all of the frames in the oven is easily effected. Accordingly it will be apparent that when the oven is full of the frames 21, each successive entering frame causes the discharge of one frame from the outlet end of the oven.

As each successive frame reaches a position over the sprocket or pulley 42, the chain starts to move angularly across the oven as indicated at 43, and accordingly the corresponding pusher member 18 will become disengaged from the engaging element 26 of the frame, and accordingly the chain will no longer transmit movement to the frame. Thus none of the frames within the oven are effected by movement of the offset run 45 of the chain.

Adjacent the outlet end of the oven, the chain passes around the sprockets 46 and 47, whereupon it travels again in operative position to cause engagement between the pusher elements 18 and the engaging elements of the frames. Accordingly, when the oven is full to its capacity with the frames 21, the entrance of each successive frame into the inlet end of the oven causes one of the frames adjacent the outlet end of the oven to assume a position over the sprocket 47, whereupon its engaging element 26 will be arranged to contact with the next approaching pusher element 18 passing around the sprocket 47.

The portion of the chain passing beyond the sprocket 47 thus will transmit movement to the frame last referred to to move it to the outlet end 12 of the oven. The pins 33 of the frame about to be discharged from the oven will be arranged in alinement with the channels between the rails 38 and 39 and accordingly will enter such channels. The convergence of these channels causes the pins to be moved toward each other, and thus the frame will be moved angularly as it approaches the outlet end of the oven until it assumes a position parallel to the chain. The frame is thus moved from the oven and is transferred from the rails 38 and 39 to the adjacent rollers 29, upon which rollers it travels substantially to the point 28, whereupon the panel in position on the frame is removed therefrom with the enamel fully baked.

The arrangement of the frames transversely within the oven permits a large number of the frames and the articles thereon to be stored in the oven, and the movement of the chain without effecting movement of the frames in the oven permits the frames and the articles to be subjected to the heat of the oven over long periods of time. Any suitable heating means for the oven may be employed, and enamel on the articles passing from the oven will be completely baked as is desired.

While the frames 21 have been described in detail, and the apparatus has been particularly referred to as being adapted for transmitting bed panels through spray booths and the oven, it will be apparent that any suitable article supporting device may be substituted for the frames 21, and that any suitable articles other than bed panels may be placed thereon. It also will be apparent that the device is not limited to the use described. For example, in place of the arrangement of the offset run 45 of the chain within an oven, it may be arranged at any suitable storage point to permit articles to be conveyed to such point for storage purposes. The extension of the offset run of the chain from the point of storage will permit the articles to remain at the point of storage instead of being successively removed therefrom.

It is to be understood that the form of the invention herewith shown and described is to be taken as a preferred example of the same, and that various changes in the shape, size and arrangement of parts may be resorted to without departing from the spirit of the invention or the scope of the subjoined claims.

I claim:

1. In a system of the character described, a conveyor chain provided with a pusher element carried by one link thereof, an elongated carrier provided with an engaging member with which said element is adapted to contact whereby movement of said chain will be transmitted to said carrier to move the latter from one point to another, said carrier being provided with projecting pins, means for supporting and guiding said carrier during such movement to cause it to travel longitudinally with respect to said chain, channels adapted to engage said pins when said carrier reaches the second mentioned point to cause it to turn to an angular position with respect to said chain, and means operative after said carrier assumes such angular position for disengaging said pusher element from said engaging member.

2. In a system of the character described a substantially horizontal conveyor provided with a pusher element adapted to engage an article to convey it from one point to a second point, substantially horizontal means for supporting the article for movement between said points, and supporting means lying in the horizontal plane of said first named supporting means for supporting articles beyond said second point, said second supporting means being provided with diverging guides engageable with the article at points spaced longitudinally with respect to the conveyor for turning the article to an angular position with respect to the conveyor.

3. In a system of the character described, a conveyor mounted to travel in a substantially horizontal plane to convey articles from one point to a second point, an elongated carrier provided with an engaging member therebeneath substantially centrally thereof, said conveyor being provided with a pusher element adapted to contact with said engaging member, substantially horizontal means for supporting and guiding the article for movement by the conveyor to cause it to travel longitudinally with respect to said conveyor, supporting members lying in the horizontal plane of said supporting and guiding means for supporting the article beyond said second point and provided with portions engageable with the article for turning it to an angular position with respect to the conveyor beyond said second point without disturbing the direction of movement of said engaging member, and means for offsetting the conveyor laterally with respect to said engaging member after the article has been turned to said angular position.

4. In a system of the character described, a conveyor mounted to travel in a substantially horizontal plane to convey articles from one point to a second point, an elongated carrier provided with an engaging member therebeneath substantially centrally thereof, said conveyor being provided with a pusher element adapted to contact with said engaging member, substantially horizontal means for supporting and guiding the article for movement by the conveyor to cause it to travel longitudinally with respect to said conveyor, a pair of supporting members lying in the horizontal plane of said supporting and guiding means beyond said second point and lying on opposite sides of the conveyor, said supporting member being provided with diverging guide grooves engageable with the article at points spaced longitudinally with respect thereto for turning the article to an angular position with respect to the conveyor adjacent said second point without disturbing the direction of movement of said engaging member, and means for offsetting the conveyor laterally with respect to said engaging member after the article has been turned to said angular position.

5. In a system of the character described, a conveyor provided with a pusher element, an article provided with an engaging member with which said element is adapted to contact whereby movement of the conveyor will be transmitted to said article to move the latter from one point to a second point, said article being provided with projecting pins, means for supporting and guiding said article for longitudinal movement with respect to the conveyor between said points, and guides engageable with said pins when the article reaches said second point to cause it to turn to an angular position with respect to the conveyor.

In testimony whereof I affix my signature.

ZACK S. LOGAN.